United States Patent
Hauers et al.

[19]

[11] Patent Number: 5,263,302
[45] Date of Patent: Nov. 23, 1993

[54] PACKING DEVICE

[76] Inventors: Manfred Hauers, Alt Breyeller Weg 21, 4060 Viersen 11; Dieter Vits, Görlitzer Strasse 5-7, 4040 Neuss 1, both of Fed. Rep. of Germany

[21] Appl. No.: 710,125

[22] Filed: Jun. 4, 1991

[30] Foreign Application Priority Data

Jun. 9, 1990 [DE] Fed. Rep. of Germany ....... 4018517

[51] Int. Cl.$^5$ ............................................. B65B 35/56
[52] U.S. Cl. ............................................. 53/544; 53/144; 53/171; 53/244; 53/540; 414/788.3
[58] Field of Search ................. 53/537, 540, 543, 544, 53/142, 143, 144, 171, 244; 414/788.3, 791.2

[56] References Cited

U.S. PATENT DOCUMENTS

| | | | |
|---|---|---|---|
| 3,456,423 | 7/1969 | Helms | 53/544 X |
| 3,631,651 | 1/1972 | Kopp | 53/544 X |
| 3,641,735 | 2/1972 | Daily et al. | 53/540 X |
| 4,124,967 | 11/1978 | Beer et al. | 53/544 X |
| 4,159,761 | 7/1979 | Egee et al. | |
| 4,611,458 | 9/1986 | Prakken | 53/537 |
| 4,776,148 | 10/1988 | Mingozzi | 53/544 X |
| 4,781,011 | 11/1988 | Prakken | 53/537 |
| 4,864,801 | 9/1989 | Fallas | 53/544 X |

FOREIGN PATENT DOCUMENTS

| | | |
|---|---|---|
| 0230756 | 8/1987 | European Pat. Off. |
| 1254524 | 11/1967 | Fed. Rep. of Germany |
| 2341644 | 4/1974 | Fed. Rep. of Germany |
| 2094258 | 9/1982 | United Kingdom |

*Primary Examiner*—John Sipos
*Assistant Examiner*—Daniel Moon
*Attorney, Agent, or Firm*—Meltzer, Lippe, Goldstein

[57] ABSTRACT

A device for the packing of rigid or flexible receptacles, especially filled plastic bags, which are triangularly or teardrop-shaped in section, comprises a conveying belt for conveying the receptacles one behind the other, a discharge unit for discharging the receptacles one behind the other into a reception case located thereunder, the reception case being rotatable about 180° and being located below the discharge unit. After a first receptacle is discharged into the reception case, it is rotated by 180° and a layer consisting of oppositely directed receptacles in which the pointed end portions overlap is formed. Thereafter, the so-formed layers are deposited in a final packing case located below the reception case. An optimum utilization of space in the final packing case is attained by the receptacles due to the overlapping of their pointed end portions.

9 Claims, 3 Drawing Sheets

PACKING DEVICE

BACKGROUND OF THE INVENTION

The present invention is directed to a device for the packing of rigid or flexible receptacles which are formed triangularly or teardrop-shaped in section, especially of filled foil or plastic bags.

Such devices are known. According to one of these known devices the receptacles, which are flexible foil or plastic bags, are disposed in layers in which the respective receptacles laterally overlap in the manner of scales. Thereafter, the layers established in this manner are introduced into a corresponding large receptacle, as for instance a cardboard box.

The invention is based on the problem to provide a device of the cited kind with which the receptacles can be packed with an especially low need of space.

SUMMARY OF THE INVENTION

According to the invention this problem is solved by a device for the packing of rigid or flexible receptacles, especially filled plastic bags, which are triangularly or teardrop-shaped in section, comprising a conveying belt for conveying the receptacles one behind the other, a discharge unit for discharging the receptacles one behind the other into a reception case located thereunder, the reception case being rotatable about 180° and being located below the discharge unit. After a first receptacle is discharged int the reception case, it is rotated by 180° and a layer consisting of oppositely directed receptacles in which the pointed end portions overlap is formed. Thereafter, the so-formed layers are deposited in a final packing case located below the reception case. An optimum utilization of space in the final packing case is attained by the receptacles due to the overlapping of their pointed end portions.

The gist of the inventive solution resides in the feature that two receptacles are oppositely aligned towards one another, respectively, so that the receptacles are superimposed at least with their pointed end portions. The degree of overlapping can be varied from 0% to 100% in response to the requirements which have to be met. Accordingly, a layer consisting of two oppositely directed and overlapping receptacles results by means of which a minimum need of space in transverse direction and, dependent on the degree of overlap, in longitudinal direction of the receptacles is required. One layer or several layers can be located one above the other in a reception case which is provided according to the invention. A plurality of these layers can be positioned one beside the other on a depositing means which is provided under the reception case according to the invention, so that a total layer results which consists of a plurality of receptacles which are oppositely directed in pairs. If the depositing means is directly formed as a large receptacle serving for the final packing case, for instance as a cardboard box, this total layer is made directly within the final packing case. If the depositing means is formed as an intermediate member, the total layer is made in an intermediate stage prior to the introduction into the final packing case and thereafter lowered into the final packing case, for example.

The layer consisting of the two oppositely disposed receptacles is established in the reception case which is located below the discharge means and which is rotatable about 180°. A first receptacle is introduced into the reception case, whereafter the reception case is rotated bout 180°. Then, a second receptacle is introduced with its pointed end portion facing towards the pointed end portion of the first receptacle or, dependent on the desired degree of overlapping, superimposing with its pointed end portion the corresponding pointed end portion of the first receptacle. If a total overlapping is desired, the second receptacle lies completely on the first receptacle, wherein the two triangle shapes or teardrop shapes complement themselves to about the shape of a rectangle in section. The reception case assures that the two receptacles are not displaced with respect to one another laterally. This is achieved by a corresponding arrangement of the side walls of the reception case which serve as stop members for the respective receptacles. The degree of overlapping can be varied by a corresponding displacement of the front walls of the reception case (in connection with a corresponding variation of the discharge means).

The receptacles which are to be packed by the inventive device can be rigid or flexible, empty or filled receptacles. The inventive device is especially suited for the packing of filled foil bags (hose bags and flat bags) which have approximately a triangular shape or a teardrop shape in their longitudinal section. The receptacles are fed one behind the other to the reception case by conveying means which is provided according to the invention. This conveying means assures that the receptacles are sufficiently spaced so that, according to a special embodiment, discharge means can discharge a receptacle into the reception case located thereunder and can return into its original position before the next receptacle approaches the discharge means. The corresponding receptacle is positioned in or on the discharge means by means of suitable positioning devices so that it is located directly above the corresponding reception case and enters the same by gravity. After rotation of the reception case about 180°, the next receptacle, which has a corresponding position as the preceding receptacle in or on the discharge means, can be introduced into the reception case by gravity.

In order to vary the degree of overlapping or scaling between the two receptacles in the reception case, in addition to the corresponding offset of the front walls of the reception case, the positioning means of the discharge means are displaceable. By this the receptacles in or on the discharge means arrive at a position which is further away from the point of rotation of the reception case which is thereunder so that they overlap less in the reception case. The opposite effect can be achieved by displacing the positioning means at the discharge means in the opposite direction.

After the reception case has received the two receptacles for the formation of one layer, it can be either opened so that the layer of receptacles leaves the reception case downwardly, or a second layer with two oppositely aligned receptacles can be formed on the first layer. As desired and according to the corresponding circumstances, the reception case can receive additional layers disposed one above the other. When the reception case is opened all the layers fall onto the depositing means located thereunder.

As mentioned above, the depositing means located under the reception case can be realized by a final packing case (cardboard box) or by intermediate conveying means. In the first case the layer of receptacles or the layers of receptacles are lowered directly into the final packing case. If the final packing case can receive several layers located one beside the other, it is displaced under the reception case so that at each opening of the reception case a new layer is established beside the preceding layer. In this manner the complete final packing case can be filled. If the bottom of the final packing is covered, the same moves back into its original position so that one can again start with the first position of a new layer.

Substantially the same principle is realized if the depositing means is formed as an intermediate conveying member. Here, the layer can fall on a laterally displaceable conveying belt, for example, on which a complete layer of the receptacles forms by lateral transport. If in this manner a complete layer is positioned on the conveying belt, the same is laterally displaced, for example under a stationary sucking bell, by which the complete layer is raised from the conveying belt and is lowered into a suitable final packing case. Then, a new complete layer can be formed on the conveying belt. However, the depositing means can also be formed as large pairs of flaps on which a complete layer of receptacles forms by lateral displacement of the pair of flaps. When the complete layer is ready, the pair of flaps opens and the complete layer falls into the final packing case (folded cardboard box) which is already present. After the opening, the pair of flaps again moves back laterally into its starting position with simultaneous closing of the flaps so that it is again ready for the reception of the next two receptacles (one layer).

Other embodiments of the depositing means are also possible. In any case, the invention is not restricted to the embodiments which are described here.

According to another embodiment, one layer falls onto a depositing means which is formed as a conveying belt. A complete layer forms on this depositing means by lateral conveying. When the complete layer is ready, the lateral advance is increased so that on the one hand the layers will be spaced and on the other hand the final layer will be under a sucking bell at the next cycle or will be placed there. The insertion system consisted of at least two sucking bells which are fastened at a star-like arrangement. The star-like arrangement is tiltable about 180° in an analogous manner. One sucking bell is situated over the conveying belt, the other over the opening of a receptacle (folded cardboard box). Both sucking bells are adapted to be lowered, on the one side for lifting-off from the conveying belt and on the other side for deposition in the receptacle. This is done alternately.

The device according to the invention has a number of advantages. The greatest advantage is realized by the feature that an especially low need of space is necessary for the packing due to the front-sided overlapping of the receptacles. The receptacles (bags) do not have to be equalized whereby an especially careful handling of the products with small efforts results. The device does not have to meet any special requirements (simple supply, no turn, no chute). An especially high filling degree in the final packing case (folded cardboard box) is achieved by the front-sided overlapping against one another. In addition to the front-sided overlapping in a longitudinal direction which is possible from 0% to 100%, a transverse overlapping of the receptacle pairs from 0%–25% can be carried out. By this, packing in standard receptacle sizes is largely possible.

The incorrect falling of the first bags or the first bag rows known with fold packers is prevented by the throw-off of the complete layer of receptacles. When doing this, the bags lock against one another. By the throw-off of the complete layer of receptacles, the striking force is substantially dampened (air displacement in the folded cardboard box). Furthermore, an optimum time of change for the final packing case (folded cardboard box) results hereby, even at a low number of bags/complete layer. The inventive device needs an especially small standing area with regard to the corresponding format range of the machine. Small distances are present so that a high output and reliability of operation can be achieved.

According to a special embodiment of the invention, the conveying means comprises an approximately horizontal accelerating belt. The receptacles are for example conveyed by an ascending belt of a bag filling machine to the accelerating belt which is normally situated higher. On the accelerating belt, receptacles preferably lie with their largest end oriented in the conveying direction. By the horizontal accelerating belt, the velocity of the receptacles is increased about an amount which is sufficient for a safe delivery of the receptacles to the discharge means. On the other hand, the pitch of the receptacles is increased by an amount which guarantees the function of the discharge means (opening and closing of the same).

Appropriately, the discharge means includes at least one flap which receives a receptacle in its horizontal condition and which discharges the receptacle downwardly by rotation of the flap. According to an especially preferred embodiment the discharge means has two cooperating flaps disposed side by side each of which receives a part of a receptacle in its horizontal condition, respectively, and which is discharged downwardly by simultaneous rotation of both flaps. If, according to this embodiment, only one flap is opened the receptacle rotates about is longitudinal axis for 180° during its fall into the reception case. If both flaps are simultaneously opened the receptacle is not rotated during its downfall. The height of the fall and the width of the receptacles are correlated.

Preferably, an adjustable and removable stop member is associated with the flap at a forward end in the conveying direction. By adjustment of this stop member, the position of the corresponding receptacle can be varied so that the same, as already mentioned above, can take different positions in the reception case which is located thereunder. In this manner the overlapping degree between two receptacles in the reception case can be varied. By the removability of the stop member, the receptacles can be fed over the flap or over the flaps for example to a chute or can be discharged in case of a breakdown of the system. The velocity of the accelerating belt can be correspondingly increased for this.

The reception case has preferably a centrally opening flap bottom. Hereby it is assured that one layer or several superimposed layers of receptacles fall reliably onto the depositing means located thereunder without causing for example displacements of the receptacles with respect to one another.

The rotation of the reception case is preferably realized by means of a step motor which is indexed in such a manner that during its dwell intervals the receptacles are introducible into the reception case and the formed layer is removable from the reception case. When the first receptacle is correctly situated in the reception case, the same is rotated about 180°. The corresponding second receptacle can then be introduced into the reception case. When the second receptacle has correctly taken its position in the reception case, either the bottom of the reception case is opened in order to discharge the layer onto the depositing means located thereunder, or further receptacles are introduced into the reception case with corresponding steps of rotation therebetween in order to form a plurality of layers one above the other. According to this embodiment, the bottom is only opened after the establishment of the desired package of layers.

Suitable control means are provided for carrying out the above-described processes—opening and closing of the flaps of the discharge means, rotation of the reception case, opening and closing of the bottom of the reception case.

The inventive device is suited for various receptacle sizes. If one wishes to pass over from small receptacles to larger receptacles, either front walls and/or side walls of the reception case are offset, or the present reception case is replaced by a larger reception case by dismounting one reception case in its place. Depending on the size of the receptacles the positioning means (stop members) at the discharge means may also have to be displaced. If one wishes to pass over from larger receptacles to smaller receptacles, the displacement of the members or the change of the same is done vice versa. Accordingly, the device can be converted very quickly and is suited for a plurality of different receptacle sizes.

Various embodiments of the depositing means have already been mentioned above.

BRIEF DESCRIPTION OF THE DRAWINGS

In the following, the invention is described in detail by means of an example in connection with the drawings. In the drawings

DETAILED DESCRIPTION OF THE INVENTION

Figure 1:
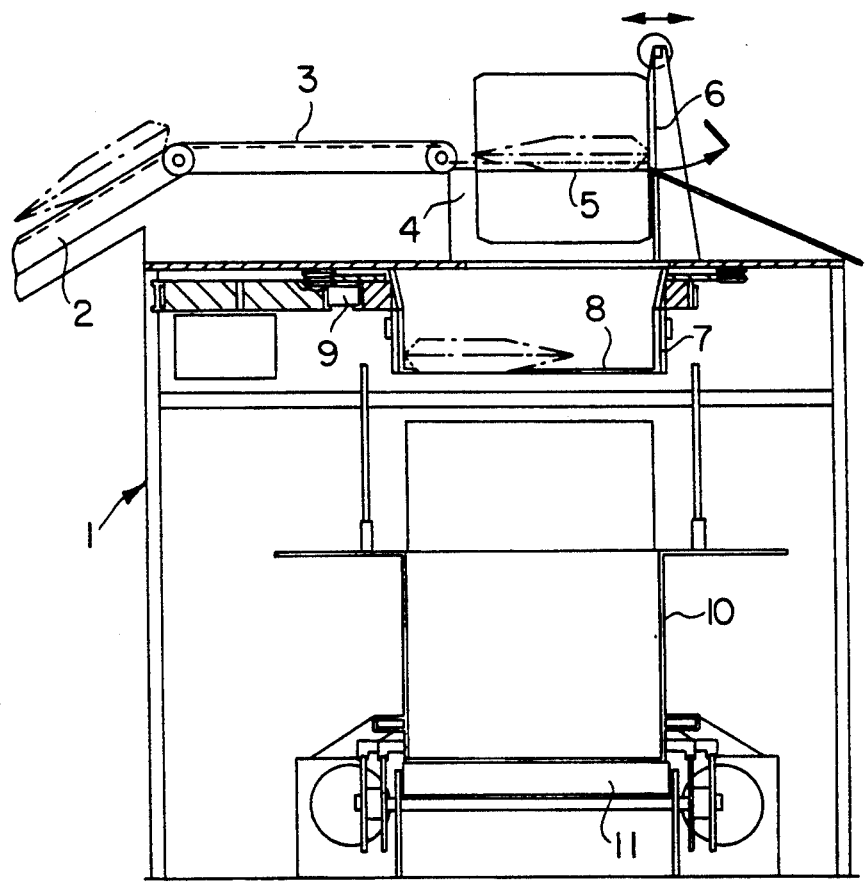
FIG. 1 shows a side view of a packing device according to the invention, partly in section.

As shown in FIG. 1, in a packing device 1, the receptacles, which are filled foil bags, are conveyed by an ascending conveying belt 2 of a bag filing machine to a horizontal accelerating belt 3 located at a higher level. The bags lie with their bottom end (i.e, the region of the largest product accumulation) along the conveying direction.

Figure 2:
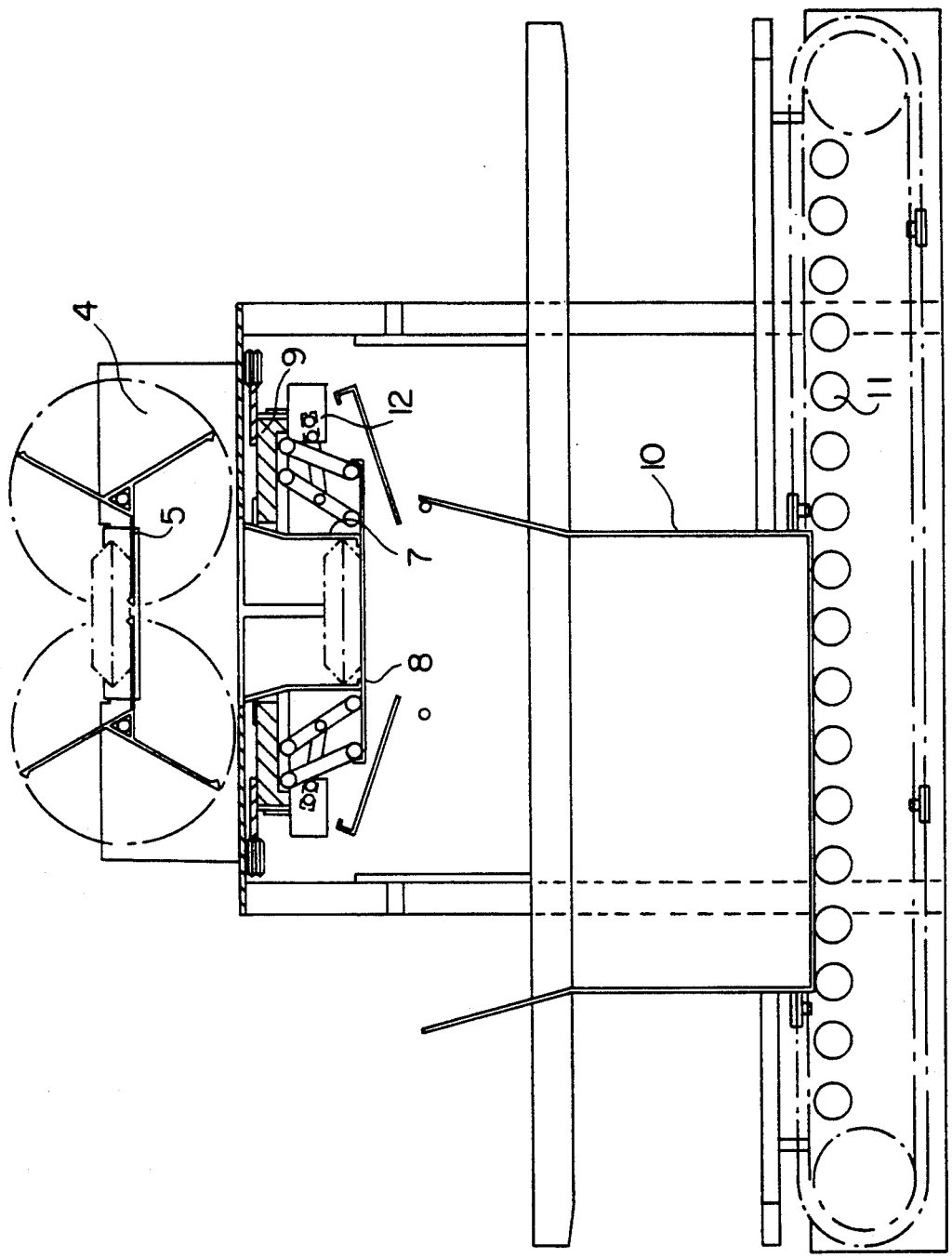
FIG. 2 shows a front view of the device of FIG. 1, partly in section.
Figure 3:
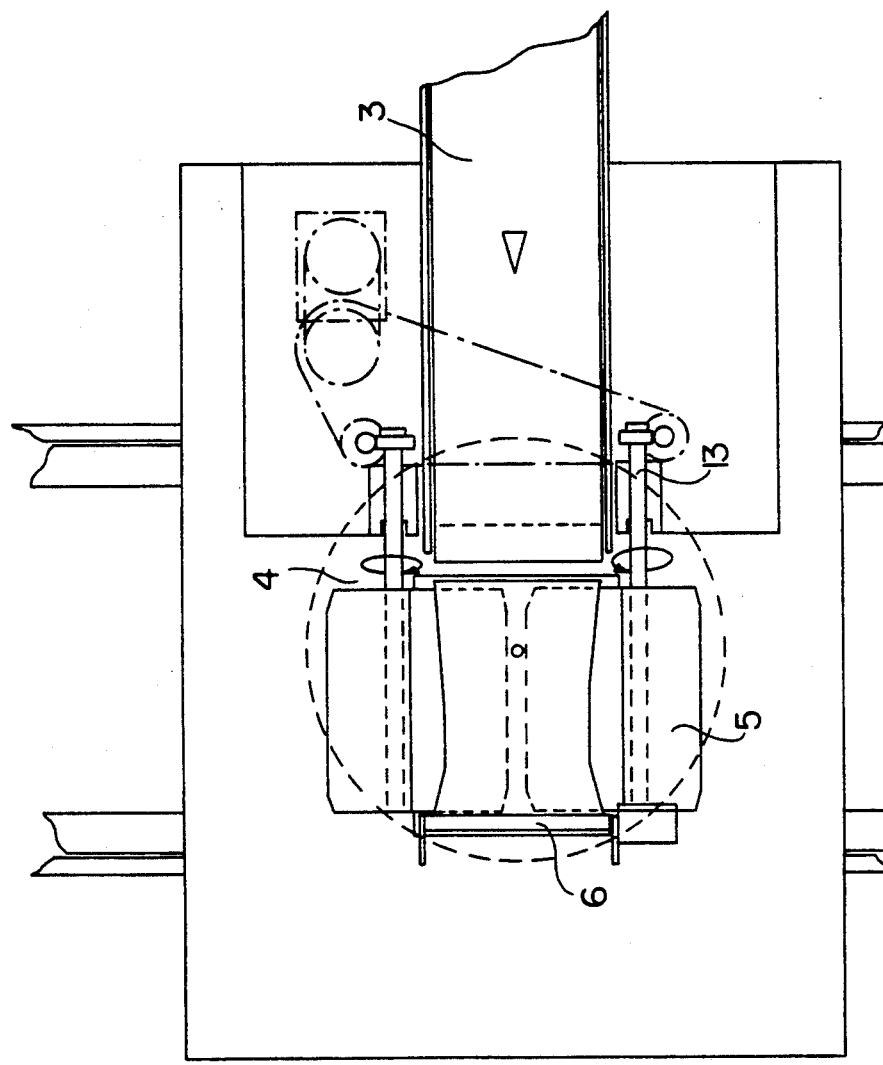
FIG. 3 shows a top view of the device shown in FIGS. 1 and 2.

The horizontal accelerating belt 3 increases the velocity of the bags for an amount which, on the one hand, is sufficient to let the bags safely slide into a stop member 6 of a discharge means located behind the accelerating belt 3 in the conveying direction, and which, on the other hand, increases the distance between the bags to a degree so that the bags can be correctly discharged downwardly. The discharge means 4 is formed as a flap system and has, as can be seen especially in FIGS. 2 and 3, two flap units disposed side by side and each rotatable about a horizontal axis. Each flap unit contains three flaps 5 extending from the horizontal axis. In the position of the flap units shown in the figures, in which one flap 5 has a horizontal position, a receptacle arrives at its two adjacent and horizontally located flaps 5, when its forward movement is stopped by a stop member 6. The receptacle is positioned on the two flaps in such a manner that a respective half of the bag rests on each respective flap. This is the position taken by the receptacle when it is ready to be discharged.

The stop member 6 on the forward end can be adjusted laterally (as shown by the double arrow in FIG. 1) and can be tilted away by rotation about a shaft perpendicular to the plane of FIG. 1. In the latter case, the bags pass over the discharge means and can be led away for example by means of a chute. This capability is provided in case of possible breakdowns of the device. An adjustment of the stop member is carried out if bags of a different size are to be packed by the device.

When the bags are resting on the two flaps 5 in their discharge position, the two shafts 13 (FIG. 3) of the flap unit are oppositely rotated by means of a suitable drive means so that the horizontal flaps separate and the receptacle falls downwardly into a reception case 7. If a rotation of the bag about its longitudinal axis by 180° is desired, only one flap 5 is rotated away downwardly, in which case the bag will flip over when it falls into the reception case 7.

The reception case 7 is an approximately rectangularly formed box which is open on its upper side. This box has corresponding side walls, front walls and a bottom 8. The bottom 8 consists of two bottom halves which extend laterally beyond the side walls of the reception case and which are downwardly tiltable by means of a suitable drive mechanism 12. Accordingly, if both bottom halves are downwardly tilted, the receptacle resting on the bottom 8 in the reception case will fall downwardly.

In the condition shown in FIG. 1, the receptacle is already in the reception case 7. The receptacle is disposed in the reception case in such a manner that its foot (i.e., wide) end faces the front wall of the case while its pointed end faces the middle of the case. As shown in FIG. 1, the reception case 7 has been rotated about 180° with regard to its position in which it received the receptacle resting on bottom 8. Now, it is ready for the reception of a second receptacle located on the flap 5 of the discharge means. When the second receptacle falls into the reception case, its pointed end will lie on the pointed end of the first receptacle so that a corresponding overlapping between the two bags results. Both bags form a layer which offers an optimum utilization of space on account of the opposite arrangement of the bags and their overlapping. After the first layer, a second layer consisting of two more bags can be disposed in the reception case. Again, a rotation of the reception case by 180° is necessary for the establishment of this layer. The rotation of reception case 7 is effected by means of a suitable drive unit 9 which may comprise, e.g., a stepping motor.

For a better reception of the bags in the reception case, the front walls and side walls of the same are tapered upwardly in a funnel-like manner. The bags sit close not only to the front walls but also to the side walls of the reception case. Through the funnel-like enlargement, positional displacements of the bags are compensated for so that an exact stacking of the bags one upon the other can be achieved.

The front walls and side walls of reception case 7 are displaceable. By adjustment of the front walls and/or side walls of the reception case 7, the same can be changed over for receiving another bag format. This can be done in connection with an adjustment of the stop member 6. In this manner the degree of overlapping of the bags can be varied.

After the stacking of the desired layers in the reception case 7, the case bottom 8 is opened by tilting away downwardly the two bottom halves of bottom 8 simultaneously. Then, the bag layers fall into a final packing case 10 located under reception case 7, for instance into a cardboard box. This final packing case 10 is disposed on a transverse conveying belt 11 and is stepwise moved after each discharge process from the reception case so that the final packing case 10 is completely filled with bags in this manner. An optimum utilization of space is achieved by the overlapped positioning of the respective bags.

An embodiment of an inventive packing device was described above which has a special discharge means 4 above the reception case. However, such a discharge means 4 is not absolutely necessary. The receptacles can be rather directly introduced into the reception case by the conveying means if a corresponding velocity control and height adjustment of the conveying means is carried out. According to this embodiment, the reception case receives a receptacle in the 0° position and receives the next receptacle after rotation into the 180° position.

If a discharge means 4 is present, the same does not have to be absolutely formed as the above-described flap system. The discharge means can also be formed in a star-like arrangement.

According to another embodiment, the inventive device has at least one means regulating the distance between the receptacles on the conveying means and/or the condition of the receptacles. This means can be realized by a suitable photocell system. The signals generated by this means are fed to a control unit which controls the stop member 6 of the discharge means 5 for the timely removal of the stop member in order to lead away the receptacle when necessary. Accordingly, if the regulating means determines that the distance between the receptacles is too small, the receptacle causing the separating distance to be too small is led away by a corresponding timely removal (tilting away) of the stop member 6. Thereafter, the stop member is moved back into its original position so that the following receptacles can be correctly discharged into the reception case. Such a function is also possible with regard to receptacles which are not in correct condition, for example, have a filing degree which is too low or which are defective. This condition is also detected by a suitable regulating means.

We claim:

1. A device for packing receptacles into packing cases, each receptacle having an apex and a base, comprising conveying means for conveying said receptacles one after another along a conveying direction, discharge means positioned adjacent said conveying means for receiving said receptacles from said conveying means and for discharging them downwardly, said discharge means including an adjustable stop member lying along the direction in which said receptacles are conveyed and positioned at a forward end of said discharge means in said conveying direction for stopping receptacles on said discharge means, a removably mounted reception case positioned below said discharge means for receiving said receptacles from said discharge means, rotating means for rotating said reception case by 180° about a fixed vertical axis so that said reception case receives a first receptacle with its apex pointed in a first direction and a second receptacle with its apex pointed in an opposite direction and superimposed on the first receptacle thereby forming oppositely directed and superimposed pairs of receptacles, said reception case including a centrally located flap bottom on which said pairs of receptacles rest and means for operating said flap bottom to discharge said pairs of receptacles downwardly, said reception case including end walls which include front faces in said conveying direction that are displaceable so as to accommodate different sized receptacles, the position of said stop member being adjustable so as to vary the extent to which said second receptacle is superimposed on said first receptacle, depositing means positioned below said reception case for receiving said superimposed pairs of receptacles discharge by said reception case, and a reversible conveying system on which said depositing means rests, said reversible conveying system conveying said depositing means back and forth in parallel to said front faces of said reception case so that said superimposed pairs of receptacles will be positioned side by side in said depositing means.

2. The device of claim 1 wherein said conveying means includes an approximately horizontally disposed accelerating belt.

3. The device of claim 1 wherein said rotating means includes motorized stepping means for rotating said reception case about said vertical axis in synchronization with the conveying of said receptacles.

4. The device of claim 1 wherein said depositing means comprises a large receptacle as a final packing case.

5. The device of claim 1 wherein said conveying system comprises a conveying belt.

6. The device of claim 1 wherein said reception case comprises adjustable side walls for adaptation to different receptacle sizes.

7. The device of claim 1 wherein said stop member can be tilted out of the path of said conveying direction so that said receptacles will overshoot said discharge means.

8. The device of claim 1 wherein said discharge means includes at least one flap rotatable about a horizontal axis, said flap receiving horizontally disposed receptacles and discharging said receptacles downwardly by rotation of said flap about said horizontal axis.

9. The device of claim 8 wherein said discharge means comprises first and second flaps each of which is rotatable about a horizontal axis, said first and second flaps being located one beside the other and cooperating with one another so that said horizontally disposed receptacles are received on both said first and second flaps and are discharge downwardly by simultaneous rotation of said first and second flaps about their horizontal axes.

* * * * *